United States Patent Office 3,499,044
Patented Mar. 3, 1970

3,499,044
METHOD OF PREPARING MIXED ISOMERS OF VITAMIN A
Walter C. Stugis, Rochester, N.Y., assignor to Eastman Kodak Company, Rochester, N.Y., a corporation of New Jersey
No Drawing. Filed Nov. 7, 1967, Ser. No. 681,082
Int. Cl. C07c 29/00, 33/00, 35/00
U.S. Cl. 260—617                   10 Claims

ABSTRACT OF THE DISCLOSURE

The preparation of vitamin A by borohydride reduction of retinene-phenolic adducts is modified by effecting the reduction in the presence of a sulfur compound, such as sodium sulfide, which acts as an isomerization catalyst. The resulting product is a mixture of all-trans and trans-cis isomers of vitamin A which exhibits enhanced isomeric stability as compared to the individual isomers.

---

This invention relates to the preparation of vitamin A. More particularly, this invention relates to a method of preparing a mixture of all-trans and trans-cis isomers of vitamin A by borohydride reduction of a retinene-phenolic adduct in the presence of a sulfur compound which acts as an isomerization catalyst.

It is well known that loss of potency occurs during storage of aqueous vitamin A compositions. It is also well known that such loss is much less in a mixture of the all-trans isomer of vitamin A and the trans-cis isomer of vitamin A (also known as the 13-cis isomer or as neovitamin A) than in an equivalent aqueous composition of either isomer by itself. Because of this improved retention of potency, mixtures of the all-trans and trans-cis isomers, including both mixtures of vitamin A alcohols and mixtures of carboxylic esters of vitamin A, are important products of commerce.

Several methods of preparing mixtures of all-trans and trans-cis isomers of vitamin A are known to the art. The most widely used procedure is isomerization by iodine catalysts. While iodine is highly effective for this purpose, its use suffers from certain serious disadvantages, in particular the lack of uniformity of reaction, resulting in formation of products of widely varying maleic value, and the difficulty of effecting purification of the isomer mixtures, i.e. removing the iodine, as is discussed, for example, in U.S. Patent 3,136,794, issued June 9, 1964.

U.S. Patent 2,839,585, issued June 17, 1958, describes a method of preparing vitamin A wherein a complex or adduct of retinene (the all-trans form of vitamin A aldehyde) and a phenolic material is reacted with an alkali metal borohydride and the resulting reaction product is hydrolyzed to yield vitamin A alcohol. More specifically, the aforesaid patent describes a process involving the admixing of a complex of retinene and a phenolic material, such as hydroquinone, a sodium or potassium borohydride, and a liquid carrier which is inert to the borohydride, such as methanol, and subsequent hydrolysis of the reaction product to vitamin A with a suitable hydrolyzing agent. While the exact nature of the reaction product of the adduct and the borohydride is not known, the overall effect of the reaction and subsequent hydrolysis is reduction of vitamin A aldehyde to vitamin A alcohol and, for simplicity, this is described herein by the term "borohydride reduction." Among the important advantages of such process is the fact that the retinene-phenolic adduct is much more stable to oxidation than vitamin A so that this precursor can be stored for extended periods of time and then readily converted to vitamin A when desired.

The product resulting from the process of U.S. Patent 2,839,585 consists essentially of all-trans vitamin A (the term vitamin A being employed herein as meaning vitamin A alcohol). In accordance with the present invention, there is provided an improved process whereby the desired mixture of all-trans and trans-cis isomers of vitamin A is produced.

It has now been discovered that by effecting the reaction of the retinene-phenolic adduct with the borohydride in the presence of certain sulfur compounds isomerization takes place to yield a mixture of the all-trans and trans-cis isomers. More particularly, the present invention comprises the process of reacting a complex of retinene and a phenolic material with a sodium or potassium borohydride in the presence of a sulfur compound selected from the group consisting of sodium sulfide, hydrogen sulfide, and 2-mercaptoethanol and thereafter hydrolyzing the reaction product to yield a mixture of all-trans and trans-cis isomers of vitamin A.

As disclosed in U.S. Patent 2,839,585, the phenolic material may be any organic compound which contains one or more hydroxyl groups attached to an aromatic ring; the borohydride may be substituted or unsubstituted; and the reaction may be carried out in any solvent or liquid carrier substantially inert to the borohydride. Moreover, the hydrolysis may be effected as a separate step, using either basic or acidic hydrolyzing agents, or it may be effected within the reaction mixture as a result of the basic character of the alkali metal portion of the borohydride. As regards such process conditions, the scope of the present invention does not differ from that described in the patent; the invention in the present instance residing specifically in the use of a sulfur compound, as hereinbefore described, to effect the desired isomerization.

In accordance with the present invention, the sulfur compound may be utilized in any catalytically effective amount, i.e. in any amount sufficient to bring about the isomerization. Suitable amounts are ordinarily in the range of from about 0.005 to about 0.2 part per part of retinene-phenolic adduct by weight, with the preferred amount being in the range of from about 0.01 to about 0.05 part per part by weight. The optimum amount in a particular instance will depend upon the particular sulfur compound used as well as upon the process conditions and may be easily determined by a few routine experiments. The sulfur compound may be introduced prior to, simultaneously with, or subsequent to bringing the retinene-phenolic adduct and the borohydride into contact. A convenient procedure for effecting the process is to add the sulfur compound in methanol, or other suitable liquid medium, to the retinene-phenolic adduct, heat to reaction temperature, and then slowly add a solution of the borohydride in water with constant stirring. After formation of the desired mixture of isomers is complete, removal of the sulfur compound from the reaction product may be readily effected by washing with water.

U.S. Patent 2,839,585 teaches that the reaction between the retinene-phenolic adduct and the borohydride is preferably effected at about room temperature, although either lower or higher temperatures may also be employed. The improved process disclosed herein is preferably conducted at temperatures higher than room temperature as these higher temperatures favor the desired isomerization. Thus, the process of this invention is preferably conducted at a temperature of about 40° C. to the reflux temperature of the reaction mixture, more preferably at a temperature of about 45° C. to about 60° C., and most preferably at a temperature of about 50 to about 55° C. The time required to complete the reaction will depend upon the temperature employed, as well as the particular compounds involved, and will ordinarily be in the range from several minutes to several hours and more usually in the range from about 20 minutes to about 50 minutes.

As is well known to those skilled in the art, the all-trans isomer of vitamin A exhibits a maleic value of zero whereas the trans-cis isomer exhibits a maleic value of 100. The mixture of isomers produced in accordance with this invention will typically have a maleic value of about 30 and thus consist of about 70 percent all-trans and about 30 percent trans-cis material.

As will be apparent from the above description, the process of this invention may be conducted without resort to any additional steps beyond those required in the process of U.S. Patent 2,839,585 since the isomerization is suitably effected simultaneously with the reduction. This is obviously an important advantage of the invention resulting in favorable economics which render commercial operation practical. Moreover, as compared with the prior art technique of iodine isomerization, the present process has the important advantage that the isomerizing agent is much more easily removed from the reaction product and the further important advantage that it results in much greater uniformity in the product produced, as indicated by the maleic value.

As indicated hereinabove, the product of the present invention is a mixture of all-trans and trans-cis isomers of vitamin A alcohol. While this product is of commercial utility as such, vitamin A is of greatest commercial importance in the form of its carboxylic esters. However, an isomeric mixture of carboxylic esters of vitamin A is readily produced by esterifying the aforesaid isomeric mixture of vitamin A alcohols.

Esterification of the mixture of all-trans and trans-cis isomers of vitamin A prepared in accordance with the present invention can be effected by any suitable method for esterification known to the art, for example, by reaction with an acid halide in an amine solvent. Typical examples include preparation of the acetate ester by reaction with acetyl chloride in pyridine and preparation of the palmitate ester by reaction with palmitoyl chloride in beta-picoline.

The invention is further illustrated by the following examples of its practice:

EXAMPLE 1

To a one-liter, 3-neck flask equipped with a stirrer, thermometer, and dropping funnel was added 100 grams of crystalline retinene-hydroquinone complex consisting of one molar proportion of hydroquinone and two molar proportions of retinene and then 470 cc. of methanol containing 2.0 grams of sodium sulfide ($Na_2S \cdot 9H_2O$) was added and the mixture was agitated for 10 minutes at a temperature of 40 to 45° C. The temperature was then increased to about 50° C. and a solution of 4.1 grams of sodium borohydride in 25 grams of water was added dropwise over a period of about 15 minutes. Agitation was continued for 40 minutes while maintaining the temperature at 50 to 55° C. and then the reaction mixture was cooled to 30° C. and 300 cc. of water and 500 cc. of petroleum ether were added. The reaction mixture was then transferred to a separatory funnel and the water-methanol layer was withdrawn, extracted with 250 cc. of petroleum ether, washed five times with 300 cc. portions of water, filtered through anhydrous sodium sulfate, and subjected to vacuum evaporation to remove the solvent. A yield of 77.2 grams of a mixture of all-trans and trans-cis isomers of vitamin A was obtained. This product showed only a trace of free aldehyde upon infrared analysis, had an ultraviolet absorption maxima at 325 m$\mu$ with E (1%, 1 cm.) ($CH_3Cl$)=1615, corresponding to a purity of 93.4%, and a maleic value of 31%.

A 77.0 gram portion of the isomeric mixture prepared as described above was added to a 2-liter flask along with 77.0 grams of beta-picoline. Over a 0.5 hour period, 77.0 grams of palmitoyl chloride was slowly added while keeping the temperature at 40 to 45° C. and agitation was continued for an additional 30 minutes, whereupon the reaction mixture was cooled to room temperature and one liter of petroleum ether was added. After cooling to 0° C., ammonia was bubbled through the solution for 20 minutes to remove excess palmitic acid, followed by filtering and washing of the filter cake with 500 cc. of petroleum ether. The solution was then transferred to a separatory funnel and washed with four 500 cc. portions of 10% HCl and six 500 cc. portions of water until neutral, filtered through anhydrous sodium sulfate, and the solvent removed under vacuum. After two decolorizations using magnesium oxide and carbon, there were recovered 125.5 grams of an isomeric mixture of all-trans and trans-cis vitamin A palmitate having the following properties:

E (1%, 1 cm.) (326 m$\mu$, ethanol) _____ 865
Purity _____ percent __ 92.5
Maleic value _____ percent __ 35.0
Acid value _____ 0.5
Gardner color _____ 12

Infrared analysis of the product showed the presence of only a trace amount of hydroxyl groups.

EXAMPLE 2

To a 500-milliliter, 3-neck flask equipped with a stirrer, thermometer and dropping funnel was added 28.4 grams of crystalline retinene-hydroquinone complex consisting of one molar proportion of hydroquinone and two molar proportions of retinene. The flask was placed in a 50° C. water bath and then 2.98 grams of 2-mercaptoethanol (10.5 percent of the adduct by weight) in 132 milliliters of methanol was added. The reaction mixture was stirred until a temperature of 46° C. was reached and then a solution of 1.0 grams of sodium borohydride in 6.0 grams of water was added over a period of 5 minutes. Stirring was continued for an additional 30 minutes while maintaining the temperature in the range of 46° C. to 56° C. After cooling to room temperature, the reaction mixture was transferred to a separatory funnel and then extracted with hexane. The hexane extract was thoroughly washed with water and the solvent was then removed under vacuum. The product, a mixture of all-trans and trans-cis vitamin A, had a purity of 78.7% and a maleic value of 33%. A control test conducted under identical conditions, except that the 2-marcaptoethanol was omitted, resulted in a product with a maleic value of 6%.

EXAMPLES 3-8

In a substantially identical manner to that described in Example 2, an isomeric mixture of all-trans and trans-cis vitamin A was produced from retinene-hydroquinone complex using different sulfur compounds and/or different concentrations of sulfur compound as isomerization catalyst. For convenience, the results obtained are summarized in tabular form below.

| Ex. No. | Sulfur compound | Concentration of sulfur compound (wt. percent of adduct) | Product purity (percent) | Maleic value (percent) |
|---|---|---|---|---|
| 3 | 2-mercaptoethanol | 9.2 | 86.8 | 27 |
| 4 | Sodium sulfide | 20.0 | 88.3 | 31 |
| 5 | do | 10.0 | 92.9 | 30 |
| 6 | do | 5.0 | 90.5 | 33 |
| 7 | do | 2.0 | 94.7 | 30 |
| 8 | Hydrogen sulfide | (*) | 100 | 27 |

*Hydrogen sulfide was bubbled through the methanol for 1.5 hours to give a solution 0.05 N in $H_2S$.

The invention has been described in detail with particular reference to preferred embodiments thereof, but it will be understood that variations and modifications can be effected within the spirit and scope of the invention as described hereinabove and as defined in the appended claims.

I claim:
1. In the process of preparing vitamin A by reacting a complex of retinene and a phenolic material with an alkali metal borohydride and thereafter hydrolyzing the reaction product, the improvement comprising effecting the reaction in the presence of a sulfur compound selected from the group consisting of sodium sulfide, hydrogen sulfide and 2-macraptoethanol to thereby yield a mixture of the all-trans and trans-cis isomers of vitamin A.

2. The process of claim 1 wherein the reaction is conducted at a temperature in the range from about 40° C. to the reflux temperature of the reaction mixture.

3. The process of claim 1 wherein the reaction is conducted at a temperature in the range from about 45° C. to about 60° C.

4. The process of claim 1 wherein the reaction is conducted at a temperature in the range from about 50° C. to about 55° C.

5. The process of claim 1 wherein the amount of sulfur compound is from about 0.005 to about 0.2 parts per part by weight of the complex.

6. The process of claim 1 wherein the amount of sulfur compound is from about 0.01 to about 0.05 parts per part by weight of the complex.

7. The process of claim 1 wherein the phenolic material is hydroquinone.

8. The process of claim 7 wherein the reaction is conducted at a temperature in the range from about 45° C. to about 60° C. and the sulfur compound is sodium sulfide at a concentration of from about 0.01 to about 0.05 parts per part by weight of the complex.

9. The process of claim 7 wherein the reaction is conducted at a temperature in the range from about 45° C. to about 60° C. and the sulfur compound is hydrogen sulfide at a concentration of from about 0.01 to about 0.05 parts per part by weight of the complex.

10. The process of claim 7 wherein the reaction is conducted at a temperature in the range from about 45° C. to about 60° C. and the sulfur compound is 2-mercaptoethanol at a concentration of from about 0.01 to about 0.05 parts per part by weight of the complex.

References Cited

UNITED STATES PATENTS

| | | |
|---|---|---|
| 2,576,104 | 11/1951 | Shantz et al. |
| 2,586,306 | 2/1952 | Copenhaver. |
| 2,587,457 | 2/1952 | Freed. |
| 2,839,585 | 6/1958 | Hawks. |
| 3,136,794 | 6/1964 | Maxwell. |

LEON ZITVER, Primary Examiner

JOSEPH E. EVANS, Assistant Examiner

U.S. Cl. X.R.

260—413, 419, 488

PO-1050
(5/69)

UNITED STATES PATENT OFFICE
CERTIFICATE OF CORRECTION

Patent No. 3,499,044      Dated March 3, 1970

Inventor(s) Walter C. Stugis

It is certified that error appears in the above-identified patent and that said Letters Patent are hereby corrected as shown below:

Column 1, line 42, "catalysts" should read --catalysis--.

Column 5, line 7, "2-macraptoethanol" should read --2-mercaptoethanol--.

SIGNED AND
SEALED

AUG 4 - 1970

(SEAL)
Attest:

Edward M. Fletcher, Jr.
Attesting Officer

WILLIAM E. SCHUYLER, JR.
Commissioner of Patents